United States Patent [19]
Thake

[11] Patent Number: 4,635,787
[45] Date of Patent: Jan. 13, 1987

[54] SORTING MACHINE

[75] Inventor: Roy C. Thake, Old Coulsdon, England

[73] Assignee: The Post Office, London, England

[21] Appl. No.: 573,615

[22] Filed: Jan. 25, 1984

[30] Foreign Application Priority Data

Jan. 25, 1983 [GB] United Kingdom ................. 8301973

[51] Int. Cl.[4] ........................ B65G 17/26; B65G 37/00

[52] U.S. Cl. .................................... 198/603; 198/607; 209/900; 271/305; 414/51

[58] Field of Search ................ 209/584, 900; 271/184, 271/185, 198, 272-275, 289, 280, 297, 305, 307, 314; 198/603-605, 607, 644; 414/51, 77

[56] References Cited

U.S. PATENT DOCUMENTS

| | | | |
|---|---|---|---|
| 1,453,125 | 4/1923 | Briggs | 414/134 |
| 1,945,475 | 1/1934 | Beardsley | 198/604 |
| 2,069,716 | 2/1937 | Beardsley et al. | 198/607 |
| 2,241,219 | 5/1941 | Plausics | 198/839 |
| 3,659,699 | 5/1972 | Donahue et al. | 198/605 |
| 3,674,143 | 7/1972 | Hunter et al. | 271/305 |
| 3,696,946 | 10/1972 | Hunter et al. | 209/900 |
| 3,805,946 | 4/1974 | Yateman et al. | 198/605 |
| 3,889,811 | 6/1975 | Yoshimura | 209/900 |
| 4,309,938 | 1/1982 | Harmon | 198/603 |
| 4,446,962 | 5/1984 | Burkhardt | 271/272 |

FOREIGN PATENT DOCUMENTS

| | | | |
|---|---|---|---|
| 638523 | 10/1936 | Fed. Rep. of Germany . | |
| 1807179 | 6/1969 | Fed. Rep. of Germany . | |
| 3141725 | 5/1983 | Fed. Rep. of Germany | 209/900 |
| 412703 | 7/1963 | Switzerland . | |
| 1303185 | 1/1973 | United Kingdom | 271/275 |

*Primary Examiner*—Robert B. Reeves
*Assistant Examiner*—Donald T. Hajec
*Attorney, Agent, or Firm*—Larson and Taylor

[57] ABSTRACT

A sorting machine for sorting generally flat items, for example letters, comprises a plurality of sorting destinations arranged in levels, and a conveying system for conveying the items each to an assigned destination. The conveying system includes a plurality of endless flexible tensile elements (8) extending along the machine, the elements each being arranged to cooperate with an adjacent element such as to be capable of transferring the items from one element to another thereby to convey the items from one level to another.

There is conveniently provided a climb section at one end of the machine where an element passes over an inclined pulley (9) to take the element to the next higher level.

9 Claims, 9 Drawing Figures

SORTING MACHINE

This invention relates to a sorting machine for sorting generally flat items e.g. generally flat postal items, and is concerned with such a machine in which a number of sorting destinations are arranged in levels.

In a known form of machine the items are conveyed in the levels between horizontally extending belts and co-operating underlying rollers which belts pass over destination boxes in the level, there being diverter fingers positioned between the rollers to divert the items each to an assigned destination box. Furthermore, at one end of the machine a further system of belts and co-operating rollers is provided to lift the items each to the appropriate levels, again diverters being provided to divert the items onto a selected level.

The transport belts in each level pass from one end of the machine to the other over the boxes and return below the boxes of the next upper row on the same side of the machine. However, this mode of routing the items is suitable only for so-called single-sided operation by which is meant operation with destination boxes on one side of the machine only.

The object of the invention is to provide a sorting machine of the kind initially referred to but which may have destination boxes on both sides of the machine.

According to the present invention, there is provided a sorting machine for sorting generally flat items, the machine comprising a plurality of sorting destinations arranged in levels, and conveying means for conveying the items each to an assigned destination, the conveying means including a plurality of endless flexible tensile elements extending along the machine, the elements each being arranged to cooperate with an adjacent element such as to be capable of transferring the items from one element to another thereby to convey the items from one level to another.

Preferably the conveying means includes a plurality of elements extending along the machine on one side and returning along the other.

Conveniently the elements extend along the machine and return at the same level. In this arrangement, therefore, there is provided one element for each level with each element cooperating with the element for an adjacent level to transfer the items successively through the levels.

There is preferably provided a climb section at one end of the machine where an element passes over an inclined pulley to take the element to the next higher level. Conveniently the climb section further includes means for returning the element from the said next higher level to the original level.

In one arrangement the inclined pulley is disposed diagonally with respect to adjacent levels. With this arrangement the adjacent elements will have a common direction of travel. Thus items will be moved along the machine on one side in one direction, and return along the other side in the opposite direction for all levels. In an alternative arrangement the inclined pulley is disposed vertically with respect to adjacent levels. With this alternative arrangement, adjacent elements will have opposite directions of travel.

The climb section preferably includes retaining means adapted to retain the items against the element whilst it passes over the inclined pulley. This is conveniently in the form of a secondary endless flexible tensile element adapted to engage the items to retain them against the element whilst it passes over the inclined pulley.

There is conceivably provided a climb section at both ends of the machine, where an element passes over an inclined pulley to take the element to the next higher element. Thus each element will raise items through two successive levels before the element returns to its original level.

According to a further aspect of the present invention, there is provided a method of sorting generally flat items into a plurality of sorting destinations arranged in levels, comprising conveying the items by means of a plurality of endless flexible tensile elements, the elements each being arranged to cooperate with an adjacent element such as to be capable of transferring the items from one element to another, whereby the items are conveyed from one level to another until each reaches its assigned destination.

A letter sorting machine in accordance with the invention will now be described with reference to the accompanying drawings in which.

Figure 1:
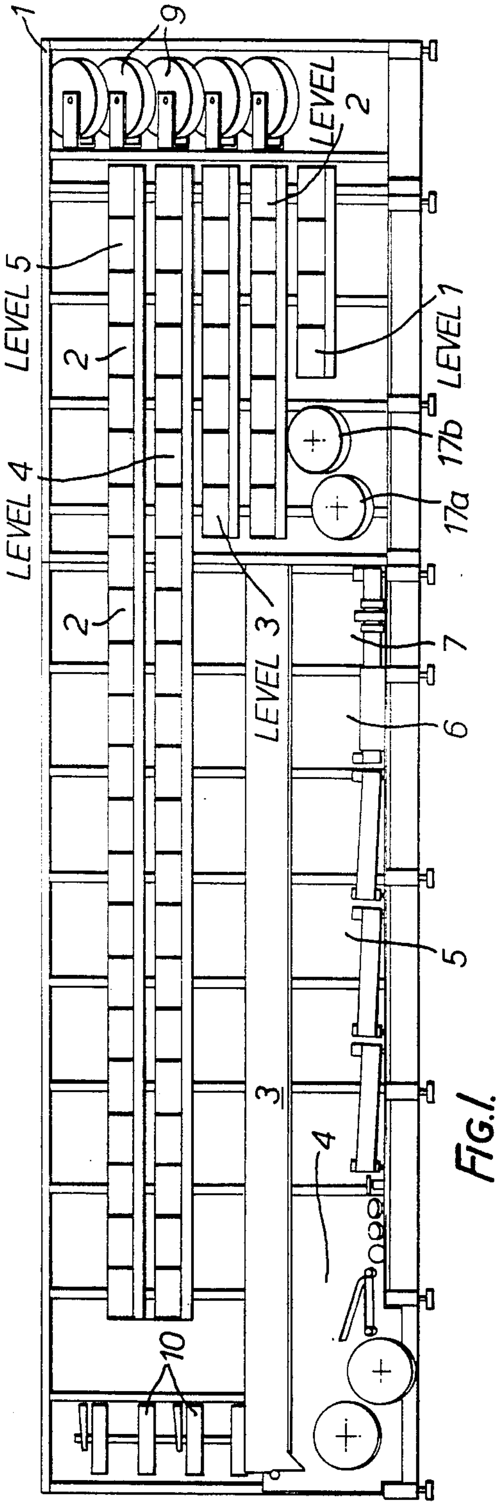
FIG. 1 is a front elevation of the machine.
Figure 3:
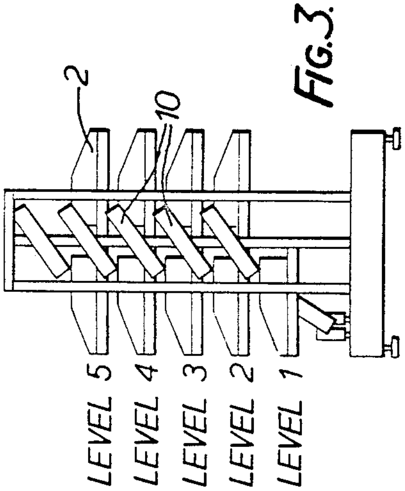
FIG. 3 is an end elevation of the machine showing a climb section as will be described.
Figure 2:
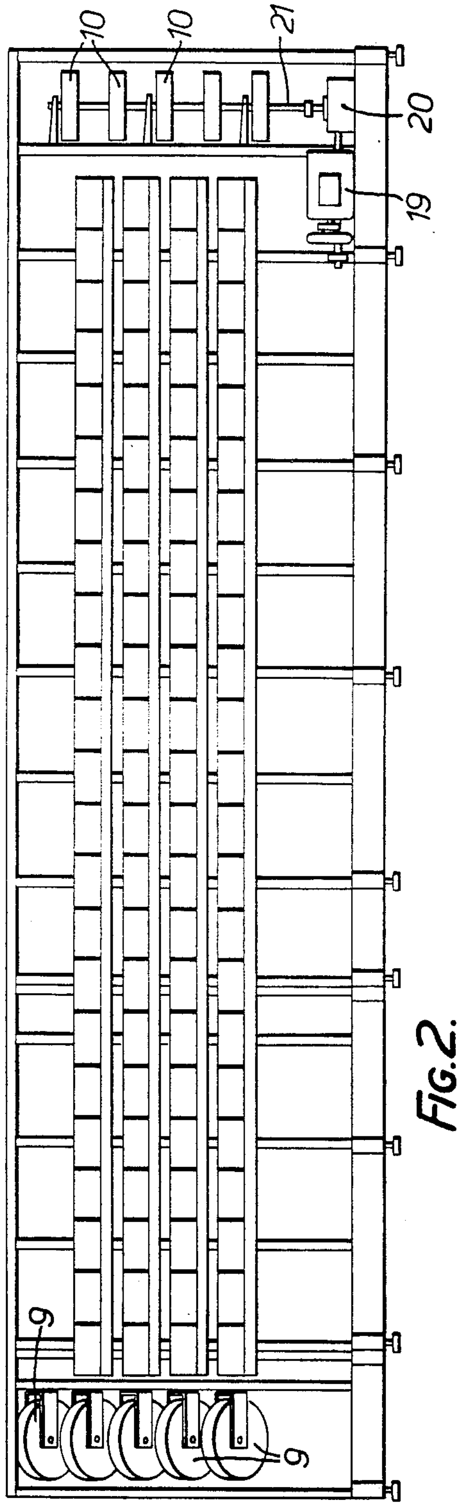
FIG. 2 is a rear elevation.
Figure 4:
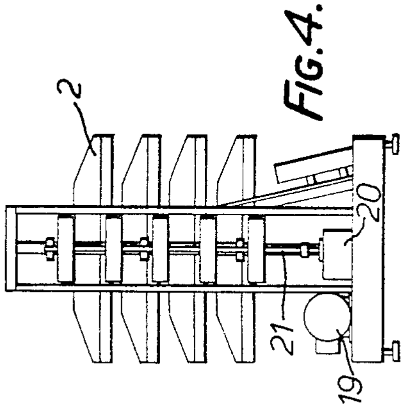
FIG. 4 is an opposite end view showing the drive end.

Referring to FIGS. 1 to 4, the machine comprises a frame which supports a number of destination boxes 2 which are arranged in five levels as shown and conveyor means for conveying the letters firstly from an input to the first level and secondly through the various levels successively. In known manner the letters pass over the boxes of a particular level by being conveyed between a transport belt and underlying rollers. The gap between each adjacent pair of rollers defines in conjunction with an underlying receptacle, a destination from the forward run by guide pulleys 14. At the drive end also of the machine, each drive pulley 10 is provided with an enclosing belt 15 which envelops the part of the transport belt from the last conveying roller on the one side of the machine to the first such roller on the other side of the machine, passing for this purpose around the conveying rollers concerned. The return run of the belt 15 passes over guide rollers 16.

To faciliate loading there are no destination boxes in levels 2 and 3 on the front of the machine (FIG. 1) in the mail stack area and, in these sterile sections, further enclosing belts are provided as in the absence of diverter fingers, the letters would otherwise fall between the transport rollers.

The path of a letter leaving the reader 7 will now be described. From the reader, the letter passes around two inclined pulleys 17*a* and 17*b* by means of the transport belt serving the units 3 to 7 and, at the region of the pulleys 17 an enclosing belt, the conveying path being under the pulley 17*a* and over the pulley 17*b*. In this way the letters are conveyed to the level 1 where they are transferred to the transport belt 8 for that level to pass through the level from left to right in FIG. 1.

Level 1 in the particular machine described is not a normal destination level but a level containing special boxes for envelopes which are "doubles" (two letters adhering together) or with short gaps between them (box 1) or are uncoded (box 2) or are invalidly or incompletely coded (boxes 3 and 4).

It will be assumed for the purposes of this description that the destination of the letter requires that it be routed to a box in level 5.

From level 1, the letter enters the climb section now being held against the underside of the transport belt by the appropriate enclosing belt 12 and passes around the climb pulley 9 to be lifted to the level 2 box and between each pair of rollers is positioned one or more diverter fingers which in a normal position of the fingers act as a support for the letters passing from one roller to another and in an operated position as a diverter for diverting the letters into the boxes. The diverters are controlled by a central control to divert the letters each into a particular box according to the destination of that letter.

The input is in the form of a mail stack 3 from which precoded letters are conveyed in known manner to a destacker 4 from which they are fed through a settle-down 5 (in which the letters are settled onto a reference edge) an irradiator 6 which illuminates the code mark pattern indicative of the destination of the letters and a reader 7 which in effect reads the destination of each letter and causes a signal to be stored in the central control so that in each case the diverter(s) of the destination box for the particular destination are operated as the letter approaches the box in question.

Figure 5:
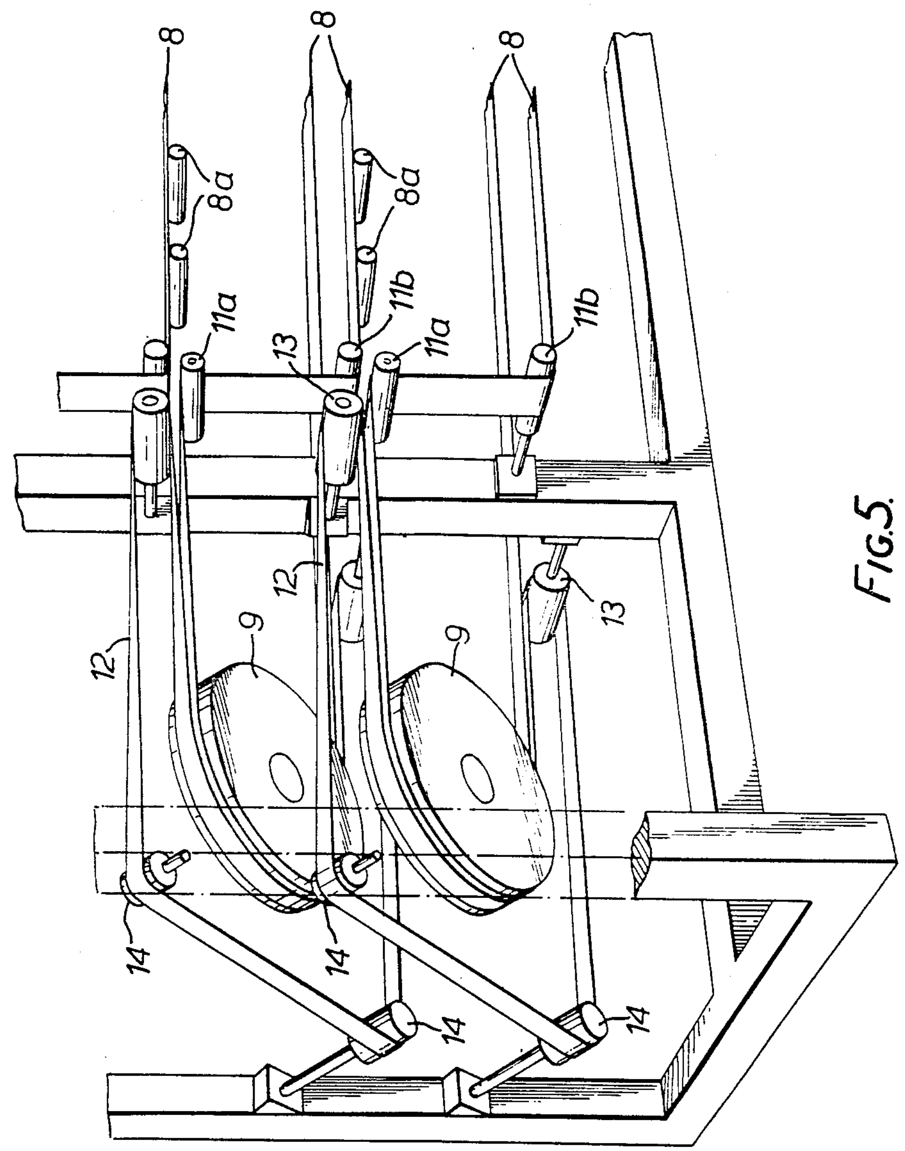
FIG. 5 shows an enlarged view of a detail of the climb section.
Figure 6:
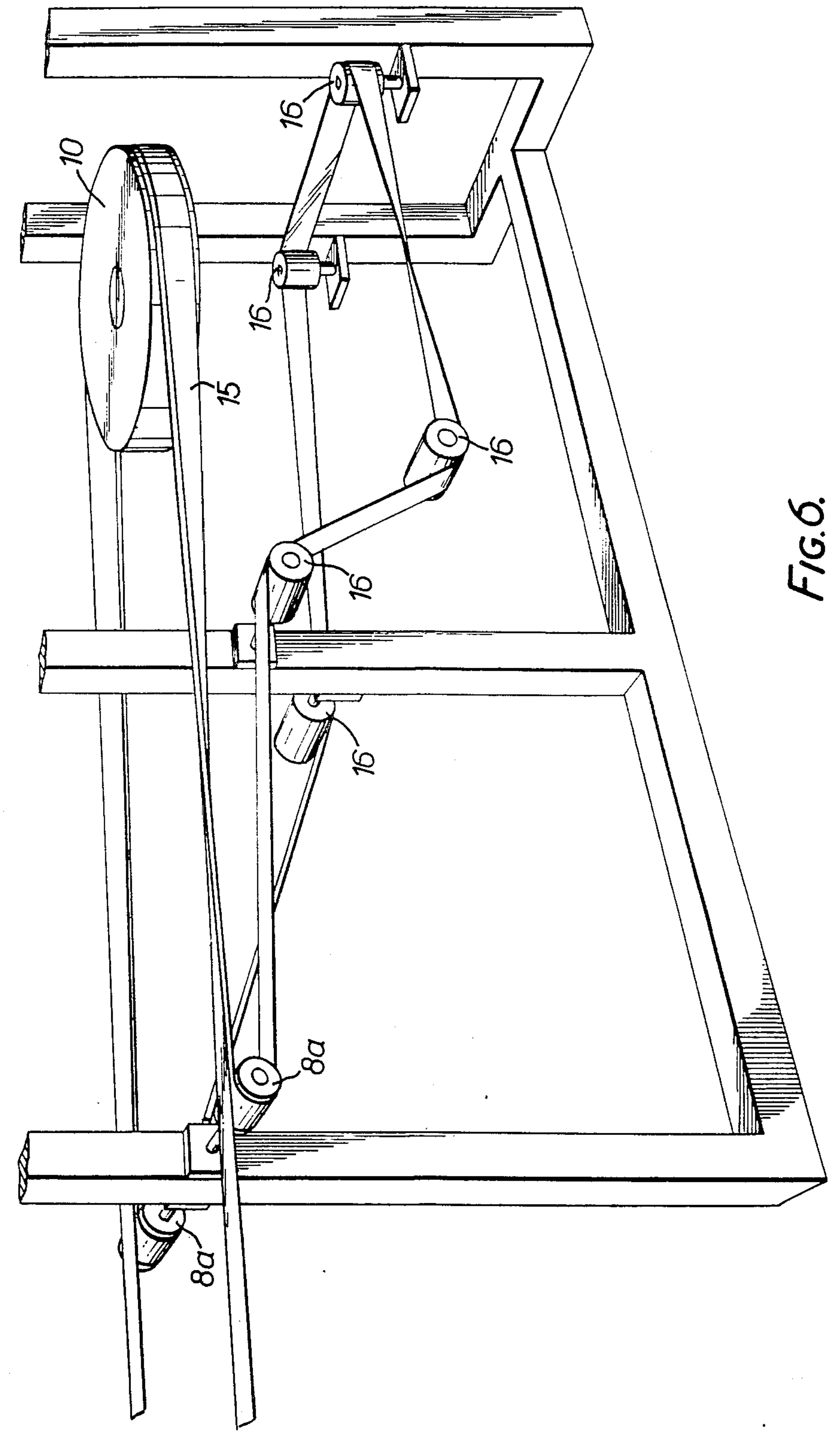
FIG. 6 is a corresponding view at the drive end.

Considering now the conveying means for conveying the letters through the various levels in more detail, this comprises (referring also to FIGS. 5 and 6) a belt 8 for each level which extends between a climb pulley 9 at one end of the machine and a drive pulley 10 at the other end. Between the pulleys 9 and 10, the belt passes over transport rollers 8*a*, between which the aforementioned fingers, not shown, are arranged. After leaving the pulley 9 which by its attitude as shown leads the belt up to the next higher level, each belt passes around two guide pulleys 11*a* and 11*b* which return the belt to its particular level. The purpose of this is to transfer the letters from one level to another as will be described. Furthermore, each climb pulley is provided with an enclosing belt 12 which envelops the part of the transport belt 8 leading between the two levels, and passes for this purpose around two end pulleys 13, and return run of the belt 12 being held away and on reaching the upper guide pulley 11*a* for that belt is gripped by the belt 8 for the second level passing around its lower guide pulley 11*b* to enter the second level. The letter passes through that level on the rear side of the machine (FIG. 2) to the drive end and after passing around the drive pulley 10 for the second level returns to the climb section over the destination boxes of the second level on the front side of the machine (FIG. 1). Again on passing through that section, the letter is lifted to the third level, passes through that level as before and continues to the fifth level, passing if necessary (having regard to the destination of the letter), to the last box at the front of the machine in that level.

The drive for the belts is by means of a motor 19 and gear box 20, driving a drive shaft 21 on which the pulleys 10 are mounted.

Whilst the above described arrangement is the preferred embodiment of the invention, alternative arrangements within the scope of the attached claims are possible.

Figure 7:
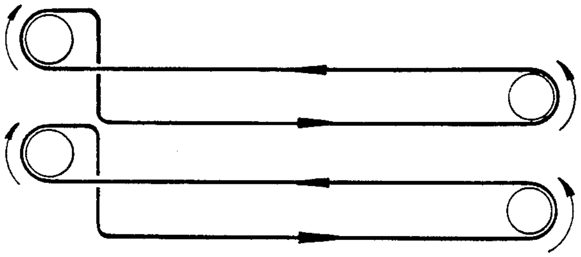
FIGS. 7 and 8 show an alternative arrangement.
Figure 8:
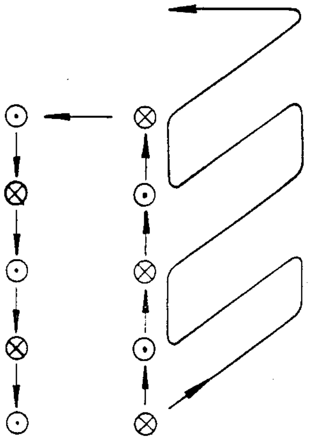

In one such arrangement, the inclined transfer and drive pulleys are vertical with the exception of the uppermost drive pulley which is horizontal. The pulleys are arranged so that each belt except the uppermost extends along the machine at one level to return at the next level on the same side of the machine here by suitably disposing the climb pulley the particular belt is led upwardly to cooperate with the next upper belt. In this way the path for the letters is through the levels successively on the one side of the machine. For the uppermost level, the belt passes along the machine on the one side and back along the machine on the other side at the same level to be led down by a vertical pulley this time serving as a drop pulley to cooperate with the next lower belt before returning to the top level. The path through the levels on the second side of the machine is as for the first side but with the transfer pulleys serving as drop pulleys so that the path is downwardly through the machine rather than upwardly. This is illustrated very diagrammatically in FIGS. 7, 8.

Figure 9:
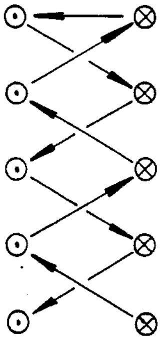
FIG. 9 shows another alternative.

In a further alternative, diagonally disposed rather than vertical transfer pulleys are employed but at each end of the machine so that the letter path leads upwardly through the machine through vertically adjacent levels on alternate sides of the machine, from one side of the machine to the other at the same level at the top of the machine and down through the machine again through vertically adjacent levels on alternate sides of the machine. This is illustrated in FIG. 9.

I claim:

1. A sorting machine for sorting generally flat items, the machine comprising a plurality of sorting destinations arranged in levels and conveying means for conveying the items each to an assigned destination, said conveying means including a plurality of endless flexible tensile elements each extending along the machine, on one side at a respective level, and returning along the other side at the same level and at least one of the elements being provided with transfer pulley means for leading the element from a first level to a position of transfer cooperation with another of said elements at a second level, so as to transfer the items from the element at the first level to said other element and thereby to convey the items through the machine.

2. A sorting machine according to claim 1 wherein there is provided a climb section at one end of the machine where each element provided with transfer pulley means passes over an inclined pulley to take the element to the next higher level.

3. A sorting machine according to claim 2 wherein the climb section includes means for returning the element from the said next higher level to the original level.

4. A sorting machine according to claim 2 wherein the inclined pulley is disposed diagonally with respect to adjacent levels.

5. A sorting machine according to claim 2 wherein the inclined pulley is disposed vertically with respect to adjacent levels.

6. A sorting machine according claim 2 wherein the climb section includes retaining means adapted to retain the items against the element whilst it passes over the inclined pulley.

7. A sorting machine according to claim 6 wherein the retaining means comprises a secondary endless flexible tensile element adapted to engage the items to retain them against the element whilst it passes over the inclined pulley.

8. A sorting machine according to claim 1 wherein there is provided a climb section at both ends of the machine where elements each pass over an inclined pulley to take the element to the next higher level.

9. A method of sorting generally flat items into a plurality of sorting destinations arranged in levels and arranged along two laterally spaced paths in each level comprising conveying the items by means of a plurality of endless flexible tensile elements which each extend along one path on one side at a respective level and return along the other path on the other side at the same level, at least one of the elements being led by transfer pulley means from a first level to a position of transfer cooperation with another of the elements at a second level to transfer the items from the element at the first level to said other element, whereby the items are conveyed from one level to another until each reaches its assigned destination.

* * * * *